US008829144B2

(12) United States Patent
Magee et al.

(10) Patent No.: US 8,829,144 B2
(45) Date of Patent: Sep. 9, 2014

(54) MQ RESINS FROM STABLE ETHYLSILICATE POLYMERS

(75) Inventors: Walter L. Magee, Manitou Beach, MI (US); Adam W. Emerson, Belleville, MI (US); Wallace G. Joslyn, Brandon, FL (US); Richard S. Odneal, Morenci, MI (US)

(73) Assignee: Silbond Corporation, Weston, MI (US)

( * ) Notice: Subject to any disclaimer, the term of this patent is extended or adjusted under 35 U.S.C. 154(b) by 636 days.

(21) Appl. No.: 12/983,540

(22) Filed: Jan. 3, 2011

(65) Prior Publication Data

US 2011/0184142 A1  Jul. 28, 2011

Related U.S. Application Data

(63) Continuation-in-part of application No. 12/136,403, filed on Jun. 10, 2008, now Pat. No. 7,884,170.

(51) Int. Cl.
| | |
|---|---|
| C08G 77/04 | (2006.01) |
| C08G 77/02 | (2006.01) |
| C07F 7/02 | (2006.01) |
| C08L 83/04 | (2006.01) |
| C08G 77/00 | (2006.01) |
| C08K 3/36 | (2006.01) |

(52) U.S. Cl.
CPC ............... *C08G 77/02* (2013.01); *C08G 77/80* (2013.01); *C08K 3/36* (2013.01); *C08L 83/04* (2013.01); *C08G 77/04* (2013.01)
USPC ............................... 528/39; 528/38; 556/453

(58) Field of Classification Search
USPC ....................... 528/39, 29; 556/453
See application file for complete search history.

(56) References Cited

U.S. PATENT DOCUMENTS

RE30,284 E     5/1980  Magee, Jr.
2009/0306326 A1*  12/2009  Magee et al. .................. 528/39

* cited by examiner

*Primary Examiner* — Ling Choi
*Assistant Examiner* — Chun-Cheng Wang
(74) *Attorney, Agent, or Firm* — Dickinson Wright PLLC

(57) ABSTRACT

An MQ resin including at least 30% $SiO_2$, preferably at least 50 wt % $SiO_2$, and having dynamic viscosity of 50 centipoises (cps) to 750 cps at 25° C. is produced from a stable ethylsilicate polymer. The ethylsilicate polymer includes not greater than 1 wt % of TEOS monomer. The ethylsilicate polymer is produced by a two step addition of catalysts wherein a hydrolysis catalyst, for example, hydrochloric acid is added initially and a second catalyst, such as phosphonitrilic chloride trimer, is added subsequently.

33 Claims, 8 Drawing Sheets

MQ RESINS FROM STABLE ETHYLSILICATE POLYMERS

This application is a continuation-in-part application of U.S. patent application Ser. No. 12/136,403, filed Jun. 10, 2008, which is hereby incorporated herein by reference in its entirety.

FIELD OF THE INVENTION

This invention relates to stable ethylsilicate polymers with 50 wt % or more available silica ($SiO_2$) and not greater than 1 wt % monomer, and methods of making such polymers, and more particularly to MQ resins formed of the ethylsilicate polymer.

BACKGROUND FOR THE INVENTION

Tetraethyl orthosilicate is a major chemical compound with a formula $Si(OC_2H_5)_4$. The compound is frequently abbreviated as TEOS and consists of four ethyl groups attached to an $SiO_4$ ion that is referred to as an ortho silicate. TEOS can also be considered to be the ethyl ester of orthosilicic acid, $Si(OH)_4$ and is a prototypical alkoxide. TEOS is a tetrahedral molecule with many analogues, most of which are prepared by alcoholysis of silicon tetrachloride or the direct reaction of silicon metal and ethanol.

Typically TEOS is hydrolyzed and condensed with mineral acid catalysts. TEOS is mixed with sufficient alcohol to allow its reactant water to be partially miscible in the presence of an acid catalyst. This allows the initial reaction to take place where one of the ethoxy groups is replaced by a water molecule liberating ethanol as a by-product. This is illustrated by the following diagram:

$$Si(OC_2H_5)_4 + H_2O \rightarrow (C_2H_5O)_3SiOH + C_2H_5OH$$

The condensation of silanol or triethoxysilanol $(RO)_3SiOH$, wherein R is $C_2H_5$, derived from the hydrolysis reaction is a competing reaction in the presence of acid catalyst. This is illustrated by the following diagram:

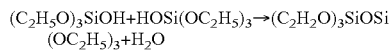

$$(C_2H_5O)_3SiOH + HOSi(OC_2H_5)_3 \rightarrow (C_2H_2O)_3SiOSi(OC_2H_5)_3 + H_2O$$

Thus, the polymerization of TEOS with water in the presence of a catalyst results from sequential hydrolysis of ethoxy groups and condensation of silanol in this over simplified view. In fact, there are other reactions, such as condensation of silanol with ethoxy groups that provide equivalent polymerization. All these processes result in polymers of increasing complexity, variety in physical properties, and usefulness in their intended applications.

Typically these polymers are thought of as combinations of linear, cyclic and polycyclic polymers. Physical properties such as dynamic viscosity, viscosity stability, and available silica ($SiO_2$ wt %), are dependent on the amount of water reacted with the TEOS. This is expressed as a percentage of the theoretical amount of water to replace all the ethoxy groups bound to silicon. The stoichiometric amount of water is 2 moles of water to 1 mole of TEOS. This is referred to as 100% hydrolysis. When reacted with this amount of water, the resulting polymer has the physical properties of amorphous silica. This can be observed by reacting TEOS with 2 moles of water and then removing the by-product ethanol by distillation. What remains is a solid material with a high percentage of $SiO_2$ remaining in the composition, typically 98% or higher. In practice it has been found that in order to obtain usable physical properties, such as a flowable liquid, only 40% of the theoretical water is added and then the ethanol byproduct is removed. This results in a low viscosity liquid ethylsilicate polymer, or ethylpolysilicate, that contains 40 wt % available $SiO_2$. The end product polymer is considered to be a 40% hydrolyzed ethylsilicate polymer This material has become an item of commerce, known as SILBOND™ 40 or Dynasil® 40.

TEOS also has many applications because of its easy conversion into $SiO_2$. For example, it may be used for chemical mechanical polishing or the synthesis of low molecular weight trimethylsiloxypolysilicates (MQ Resins) that are useful as additives for release coatings in pressure sensitive adhesive applications and liquid silicone rubber. The role of MQ Resins in such formulations is to modify the properties of the cured silicone rubber. The silicone rubber is hardened by the MQ resin to a higher modulus. For pressure sensitive release applications MQ resin increases the release forces of the adhesive. In both applications, the presence of the low molecular weight MQ Resins is detrimental.

A further application for TEOS, where polymer distribution with reduced amounts of low molecular weight material are desired, relates to the formation of polysilicate binders for zinc rich coatings, investment casting, refractory, sand core, and ceramic articles in general. A developing limitation for all these applications is the amount of low boiling alcohol by-product, referred to as low boilers, liberated during the further hydrolysis of the ethylsilicate polymer. This raises the amount of volatile organic components (VOCs) present in the formulation. More environmentally friendly compositions are desired.

SUMMARY OF THE INVENTION

The invention provides an MQ resin produced from a stable ethylsilicate polymer in liquid i.e. flowable form. The ethylsilicate polymer includes between 50 wt % to 60 wt % silica ($SiO_2$) and preferably between 53 wt % and 55 wt % silica ($SiO_2$) and has a dynamic viscosity of 10 centipoises (cps) to 1,000 cps at 25° C. The MQ resin maintains a dynamic viscosity of 50 cps to 750 cps at 25° C. for at least 2 months. Preferably, the ethylsilicate polymer is essentially free or substantially free of monomer. More preferably, the ethylsilicate polymer is completely free of monomer and remains in a flowable state for up to one year or more.

The invention also contemplates a process for making stable ethylsilicate polymer in liquid or flowable form with between about 50 wt % to about 60 wt % silica, a dynamic viscosity of 10 cps to 1000 cps at 25° C., and including less than 1 wt % monomer. The method includes the step of providing a mass of TEOS monomer, for example a condensed TEOS monomer including 28 wt % $SiO_2$, and hydrolyzing the TEOS monomer with a hydrolyzing catalyst, for example a mineral acid. The method also includes adding ethanol to the TEOS monomer with a mineral acid catalyst. Then the mixture is heated to about 72° C. and acidified water is added over a period of time. After completion of the water addition, a second catalyst step is performed, including adding a condensation catalyst, for example a catalyst including 99 wt % of phosphoronitrilic chloride, such as a phosphoronitrilic chloride trimer. The mixture is stirred at reflux for about 2 hours and all of the alcohol is removed by distillation.

The combination of a mineral acid catalyst and a PNC catalyst in a two step process produces hydrolysis amounts up to about 90%, lower dynamic viscosity and an unusually high level of viscosity stability. It has also been found that the molecular distribution as indicated by gel permeation chromatography is different. The difference is a narrower distribution that is shifted to smaller size molecules.

The invention will now be described in connection with the accompanying drawings.

DETAILED DESCRIPTION

Figure 1:
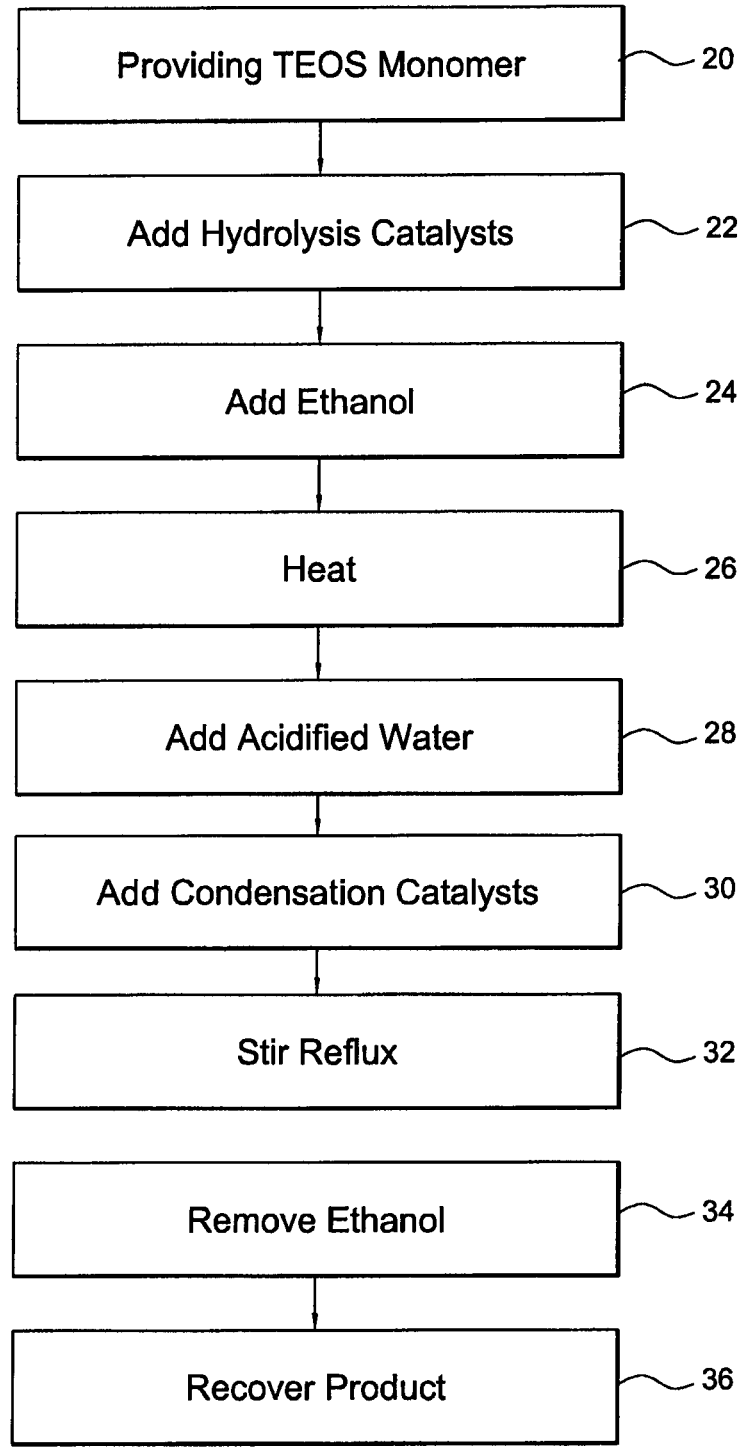
FIG. 1 is a flow chart illustrating a process for making a stable ethylsilicate polymer with 50% to 60% available $SiO_2$ by weight in accordance with the present invention.

A process for making a stable ethylsilicate polymer in liquid form with an available $SiO_2$ content of 50 wt % to 60 wt % will be described in connection with FIG. 1. The stable ethylsilicate polymer has a dynamic viscosity of 50 cps to 70 cps at 25° C. and remains in liquid form for a period of about a year. The dynamic viscosity of the ethylsilicate polymer is stable. For example, after heating the ethylsilicate polymer to 55° C. and maintaining the ethylsilicate polymer at that temperature for 20 days, the ethylsilicate polymer still has a dynamic viscosity at 25° C. of less than 1000 cps.

The process includes the step 20 of providing a mass of TEOS, such as a condensed TEOS monomer including 28 wt % $SiO_2$, for example SILBOND™ Condensed. Alternatively, the process can including providing another monomer including TEOS. The TEOS can be referred to as tetra-ethyl-orthosilicate or equivalently tetra-ethoxy-silane. The TEOS monomer has the following structure:

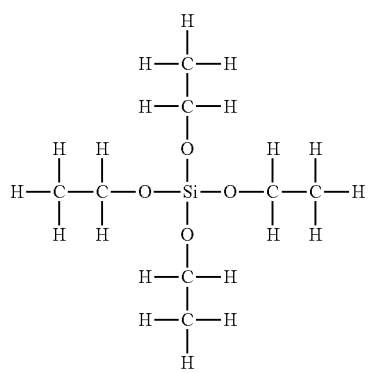

A hydrolysis catalyst, such as a mineral acid, is added to the TEOS in step 22. For example, in a laboratory, the process included providing 780 grams of TEOS monomer, and adding two drops of a mineral acid including 37 wt % HCl to the 780 grams of TEOS monomer. The hydrolysis catalyst can include other types of mineral acids. In step 24, the method includes adding to the mixture 10 wt. % to 12 wt. % ethanol, based on the total weight of the TEOS charge, or multiples of 125 grams of ethanol. In the example, 125 grams of 200 proof ethanol were added. In step 26, the mixture is heated, for example to about 72° C. Then, in step 28, acidified water is added to the mixture, for example water acidified with two drops of 37% HCl over a 1 hour time period. To achieve 70% hydrolysis, the example process included adding 94.5 grams of acidified water. To achieve 80% hydrolysis, the example included adding 108 grams of water. A condensation catalyst, preferably a PNC catalyst, such a phosphononitrilic chloride trimer, is introduced into the mixture in step 30. The PNC catalyst can be another type of catalyst including PNC. Preferably, the condensation catalyst includes PNC in an amount of at least 50 wt %, more preferably at least 70 wt %, even more preferably at least 90 wt %, such as 99 wt %, based on the total weight of the PNC catalyst. In step 32 the mixture was stirred at reflux for a period of time, such as about 2 hours. In step 34, the ethanol was removed by heating. In this case, the temperature increased from 80° C. to about 140° C. over approximately three hours. In step 36, the ethanol was collected by distillation and a clear stable silicate ester mixture was recovered.

Examination of 40% hydrolyzed compositions reveals that they are distributions of various individual components. For example, gas chromatography of the liquid material, which only separates volatile components, shows that the material is a mixture of TEOS, dimer, trimer, tetramer and so forth. These linear structures have been characterized by mass spectral analysis. This analysis method only separates volatile components. Other methods, such as gel permeation chromatography, which separates components based on their molecular size, reveals more complicated distributions. TEOS polymers that are 40% hydrolyzed are complex mixtures ranging from lower oligomeric components such as dimer, trimer, and tetramer to more complicated cyclic and polycyclic structures. The size of these components can range from thousands of molecular units to tens of thousands of molecular units.

As the hydrolysis amount is increased, the physical properties of the resulting polymer change. Increasing hydrolysis level to 50% hydrolysis, doubles dynamic viscosity, increases silica content to 45% and shifts the molecular weight distribution to higher molecular weight components. Viscosity stability becomes an increasingly important issue. Viscosity stability is a function of the amount of uncondensed silanol remaining in the polymer structure. If the amount of silanol is too high, the viscosity of the resulting polymer increases with time, causing increasing thickening of the polymer.

At hydrolysis amounts of 70% or higher, when using mineral acids as catalyst, the dynamic viscosity and the viscosity stability of the resulting isolated polymer becomes impractical. This means that the polymer does not flow properly and after standing for several days, the polymer does not flow at all, becoming an intractable gelled mass.

When phosphonitrilic chloride is used at the hydrolysis amounts of 70% or higher, low dynamic viscosity polymers (50 cps) at 25° C. are produced that show remarkable dynamic viscosity stability. The molecular distribution as indicated by gel permeation chromatography is also different, specifically with the distributions being narrow and shifted to smaller size molecules.

Further, an increase in hydrolysis % typically leads to a more environmentally friendly process. For example, 40% hydrolyzed ethylsilicate polymer releases 2.4 moles of ethanol per equivalent of polymer, a restricted VOC component, while a 70% hydrolyzed ethylsilicate polymer releases only 1.2 moles of ethanol per equivalent of polymer, a 50% reduction.

The TEOS is typically hydrolyzed in an amount up to 90%. Thus, the end product of ethylsilicate polymer of the present invention is typically hydrolyzed in an amount up to 90%, preferably 75% to 85%.

As stated above, the end product of ethylsilicate polymer includes $SiO_2$ in an amount of 50 wt % to 60 wt %. Alternatively, the ethylsilicate polymer polymer includes $SiO_2$ in an amount of 52 wt % to 58 wt %. The amount of $SiO_2$ in the ethylsilicate polymer polymer is determined by hydrolyzing and dehydrating the ethylsilicate polymer to a gelled state with concentrated sulfuric acid. The gelled sample is treated with 70% nitric acid to oxidize the remaining organic components. The crucible contents are slowly burned off and the silica gel is fired in a muffle furnace. The fired $SiO_2$ is then weighed to provide the wt % of $SiO_2$ in the ethylsilicate polymer.

Phosphonitrilic chloride (PNC) comes in many forms. The most common of which is cyclic trimer. This material is commercially available and produces a low dynamic viscosity polymer. The prior art describes various linear phosphonitrilic chloride polymers which also work in an equivalent way.

The wt % of each component of the end product of ethylsilicate polymer can be determined by nuclear magnetic resonance (NMR). Further, gas permeation chromatography can be used to separate components of the ethylsilicate polymer according to their molecular size, based on the flow of the ethylsilicate polymer through a porous packing.

During the process of making the stable ethylsilicate polymer, as shown in FIG. 1, the TEOS monomer is hydrolyzed in an amount up to 90% and condensed so that the stable ethylsilicate polymer produced is free, substantially free, or essentially free of monomer. As such, the ethylsilicate polymer includes only traces of monomer to no monomer. Preferably, the final product ethylsilicate polymer includes no added or left over monomer. For example, the ethylsilicate polymer can include at least one monomer in an amount not greater than 1 wt %, more preferably not greater than 0.5 wt %, even more preferably not greater than 0.1 wt %, and most preferably 0 wt %. As alluded to above, the ethylsilicate polymer can include one or more monomers, but preferably the finished product of ethylsilicate polymer includes no left over monomers, and as such, only traces of monomer to no monomer would be present.

The monomer that could be present in the end product of ethylsilicate polymer is TEOS monomer. As alluded to above, the ethylsilicate polymer is preferably free, substantially free, or essentially free of the TEOS monomer. However, the ethylsilicate polymer could include the TEOS monomer in an amount not greater than 1 wt %, preferably not greater than 0.5 wt %, even more preferably not greater than 0.1 wt %, and most preferably 0 wt %.

The TEOS monomer could have a low molecular weight component. For example, the monomer could have a molecular weight at peak (Mp) of 208.3 g/mol, or not greater than 210 g/mol. The molecular weight at peak can be referred to as the average molecular weight. The molecular weight of the ethylsilicate polymer and the components of the ethylsilicate can be determined by GPC.

Preferably, the ethylsilicate polymer is substantially free of linear oligomers. However, the ethylsilicate polymer could include at least one linear oligomer in an amount not greater than 1 wt %, preferably not greater than 0.5 wt %, more preferably not greater than 0.1 wt %, and most preferably 0 wt %. As alluded to above, the ethylsilicate polymer could include one or more linear oligomers, but preferably the ethylsilicate polymer includes no linear oligomers. At least one of the linear oligomers could have a molecular weight at peak of 208.33 g/mol, or not greater than 210 g/mol.

Further at least one of the linear oligomers that could be present is selected from the group comprising a dimer, trimer, and tetramer.

The ethylsilicate polymer could include at least one dimer in an amount not greater than 5 wt %, preferably not greater than 4 wt %, more preferably not greater than 2 wt %, and most preferably 0 wt %. The dimer could include hexaethoxydisiloxane. As alluded to above, the ethylsilicate polymer could include one or more dimers, but preferably the ethylsilicate polymer includes no dimer. At least one of the dimers could have a molecular weight at peak of 342.5 g/mol, or not greater than 345 g/mol.

The ethylsilicate polymer could include at least one trimer in an amount not greater than 20 wt %, preferably not greater than 16 wt %, and more preferably not greater than 15 wt %. The trimers could include a phosphoronitrilic chloride trimer having a molecular weight at peak of 347.66 g/mol, or not greater than 350 g/mol. The trimers could also include a linear TEOS trimer having a molecular weight of 476.7 g/mol, or not greater than 480 g/mol. The trimers could also include a cyclic TEOS trimer, having a molecular weight of 392.6 g/mol, or not greater than 480 g/mol. As alluded to above, the ethylsilicate polymer could include one or more trimers, but preferably the ethylsilicate polymer includes no trimer.

The ethylsilicate polymer could include at least one tetramer in an amount not greater than 20 wt %, preferably not greater than 16 wt %, and more preferably not greater than 15 wt %. The tetramers could include a linear TEOS tetramer having a molecular weight at peak of 610.9 g/mol, or not greater than 615 g/mol. The tetramers could also include a cyclic tetramer having a molecular weight of not greater than 615 g/mol. As alluded to above, the ethylsilicate polymer could include one or more tetramers, but preferably the ethylsilicate polymer includes no tetramers.

At least one of the oligomers could be a pentamer or a hexamer, which are usually cyclic.

The ethylsilicate polymer is preferably free or essentially free of silanol. The ethylsilicate polymer could include not greater than 1 wt % silanol, based on the total weight of the ethylsilicate polymer, preferably not greater than 0.5 wt %, more preferably not greater than 0.01 wt %, and most preferably 0 wt %.

The ethylsilicate polymer has a dynamic viscosity of from 10 cps to 1,000 cps at 25° C., alternatively from 60 cps to 500 cps, or from 85 cps to 300 cps at 25° C. The dynamic viscosity of the ethylsilicate polymer can be measured according to the ASTM D 445-06 standard. The dynamic viscosity is determined by measuring the time (in seconds) required for a standard volume of the liquid ethylsilicate polymer to flow through a calibrated capillary. The time is multiplied by the viscometer constant and the specific gravity of the ethylsilicate polymer to provide the dynamic viscosity of the ethylsilicate polymer in cps.

The kinematic viscosity at 25° C. of the ethylsilicate polymer is measured after heating the ethylsilicate polymer for a period of 20 days,. The ethylsilicate polymer maintains a dynamic viscosity at 25° C. of 10 cps to 1,000 cps after heating the ethylsilicate polymer to a temperature of 55° C. for a period of 20 days. Alternatively, the ethylsilicate polymer can maintain a dynamic viscosity at 25° C. of 60 cps to 500 cps, or 85 cps to 410 cps, or 190 cps to 350 cps, after heating the ethylsilicate polymer to a temperature of 55° C. for a period of 20 days.

Preferably, the ethylsilicate polymer has dynamic viscosity increase of less than 300 cps at 25° C., after heating the after heating the ethylsilicate polymer to a temperature of 55° C. for a period of 20 days. The dynamic viscosity of the ethylsilicate polymer after being heated for 20 days is compared to the dynamic viscosity of the ethylsilicate polymer before heating. The low dynamic viscosity increase after heating indicates the dynamic viscosity of the ethylsilicate polymer is stable. The ethylsilicate polymer does not form a gel after heating to a temperature of 55° C. for a period of 20 days. The low dynamic viscosity increase also indicates the ethylsilicate polymer will not for a gel for at least 6 months at room temperature.

As stated above, the ethylsilicate polymer provides improved viscosity stability. Preferably, the ethylsilicate polymer maintains a dynamic viscosity of from 10 cps to 1,000 cps at 25° C. for at least 4 months, more preferably at least 5 months, and most preferably at least 6 months.

The molecular weight at peak (Mp), average molar mass (Mz), and polydisparity of the ethylsilicate polymer can be determined by conventional GPC with refractive index detection. The molecular weight at peak (Mp) can be referred to as the average molecular weight. Preferably, the ethylsilicate polymer has an Mp of at least 34,600 g/mol. Alternatively, the ethylsilicate polymer has an Mp of 33000 g/mol to 35000 g/mol.

The ethylsilicate polymer preferably has an average molar mass (Mz) of at least 107,000 g/mol. Alternatively, the ethylsilicate polymer has an Mz of 400,000 g/mol to 600,000 g/mol. The Mz is determined dividing the weight average molecular weight of the ethylsilicate polymer by the number average molecular weight of the ethylsilicate polymer.

Preferably, the ethylsilicate polymer has a flash point of 75° F. to 150° F. Alternatively, the ethylsilicate polymer has a flash point of 80° F. to 130° F., or 88° F. to 118° F. The flash point of the ethylsilicate polymer is measured according to the ASTM D 56-05 standard.

Preferably, the ethylsilicate polymer has a specific gravity of 1.18 g/cm$^3$ to 1.26 g/cm$^3$. Alternatively, the ethylsilicate polymer has a specific gravity of from 1.19 g/cm$^3$ to 1.24 g/cm$^3$, or 1.20 g/cm$^3$ to 1.22 g/cm$^3$. The specific gravity is measured according to ASTM D 891-09.

The color of the ethylsilicate polymer can be tested according to the platinum-cobalt (Hazen) standards established by the American Public Health Association. It involves visual comparisons of a sample of the ethylsilicate polymer with prepared standards in matched Nessler tubes. Preferably, the ethylsilicate polymer has a color of 15 to 60. Alternatively, the ethylsilicate polymer has a color of 18 to 55, or 20 to 50.

The ethylsilicate polymer is free, substantially free, or essentially free of low boilers, such as low boiling alcohol by-product that is liberated during hydrolysis of ethylsilicate polymer. The low boiling alcohol by-product content raises the amount of volatile organic components (VOC) present in ethylsilicate polymer. The low boilers are fast evaporating solvent having a boiling point of 70 to 100° C. Preferably, the ethylsilicate polymer comprises low boilers in an amount not greater than 5 wt %, more preferably 0.1 wt % to 3 wt %, and most preferably 0 wt %. The amount of low boilers is measured using Gas Liquid Chromatography.

During the process of producing the ethylsilicate polymer, it is desirable to limit the amount of VOCs generated, which can be collected by distillation. The ethylsilicate polymer comprises not greater than 15 wt % volatile material, based on the total weight of the ethylsilicate polymer and the volatile material, more preferably not greater than 12 wt %. The amount of volatile material of the ethylsilicate polymer is measured according to the ASTM D 2369-07 standard.

The ethylsilicate polymer preferably includes no HCl acid. However, the ethylsilicate polymer could include HCl acid in an amount not greater than 0.1 wt %, based on the total weight of the ethylsilicate polymer, preferably not greater than 0.006 wt %. The amount of HCl can be measured by titrating a sample of the ethylsilicate polymer to the neutral red-methylene blue end point and then calculating the weight percent of acidity or alkalinity.

The process of producing the ethylsilicate polymer includes replacing ethoxy groups bound to silicon of the TEOS with water. This is expressed as a percentage of the theoretical amount of water to replace all the ethoxy groups. The stoichiometric amount of water is 2 moles of water to 1 mole of TEOS. This is referred to as 100% hydrolysis. The ethylsilicate polymer can be produced by a processes comprising 50% to 60% hydrolysis of the TEOS. Alternatively, the ethylsilicate polymer is produced by a process comprising 65% to 85% hydrolysis of the TEOS.

As alluded to above, the process of producing the ethylsilicate polymer includes providing a mass of tetra TEOS monomer, such as tetra TEOS monomer in a reactor, and adding ethanol to the TEOS monomer to form a mixture. The method comprises adding a hydrolysis catalyst, such as a mineral acid, to the mixture, followed by a condensation catalysts, preferably the PNC catalyst, such as a PNC trimer. The mixture is stirred and heated with the PNC catalyst while refluxing. The method next includes adding water to the mixture, recovering ethanol from the mixture, and recovering an ethylsilicate polymer.

The method preferably includes hydrolyzing a mixture including TEOS monomer and ethanol in the presence of a mineral acid, followed by condensing the mixture with a PNC catalyst. Typically the method includes adding a hydrolysis catalyst, such as a mineral acid to the TEOS monomer, before adding the PNC catalyst. Examples of hydrolysis catalysts include mineral acid, such as hydrochloric acid, sulfuric acid, nitric acid, boric acid, phosphoric acid, hydrofluoric acid, and hydrobromic acid. After adding the hydrolysis catalyst, the method includes adding water acidified with a mineral acid to form the mixture. The condensation catalyst is then added to the mixture and the ethanol and ethylsilicate polymer are recovered.

The following is an example of a preparation of the low dynamic viscosity ethylsilicate polymer that is produced using a two step addition of catalysts wherein one step includes adding a phosphonetrilic chloride catalyst.

INVENTIVE EXAMPLE 1

Production of Ethylsilicate Polymer Using PNC Catalyst

A 2 liter four necked round bottom flask, equipped with a central stirrer, thermometer, Claisen take off adaptor, and addition funnel, is charged with 780 grams of a condensed TEOS monomer including 28 wt % $SiO_2$, 2 drops of 37% HCl, and 125 grams of 200 proof ethanol. The mixture is heated to 72° C. To this hot stirring mixture is added 94.5 grams of water acidified with 2 drops of 37% HCl over a period of 1 hour. After completion of the addition of acidified water, 0.1 grams of 99% phosphoronitrilic chloride trimer (PNC catalyst) was introduced. The mixture is stirred at reflux for 2 hours and then all ethanol was removed by heating. The temperature of the mixture increased from 80° C. to 140° C. over about 3 hours. Then, 530 grams of volatile material was collected by distillation leaving 443 grams of a clear silicate ester mixture. The clear ethyl polysilicate mixture was stable even after heating at 55° C. for 20 days, showing only a modest increase in dynamic viscosity from 100 cps to 200 cps. This is indicative of stability in excess of 6-12 months at room temperature.

Figure 2:
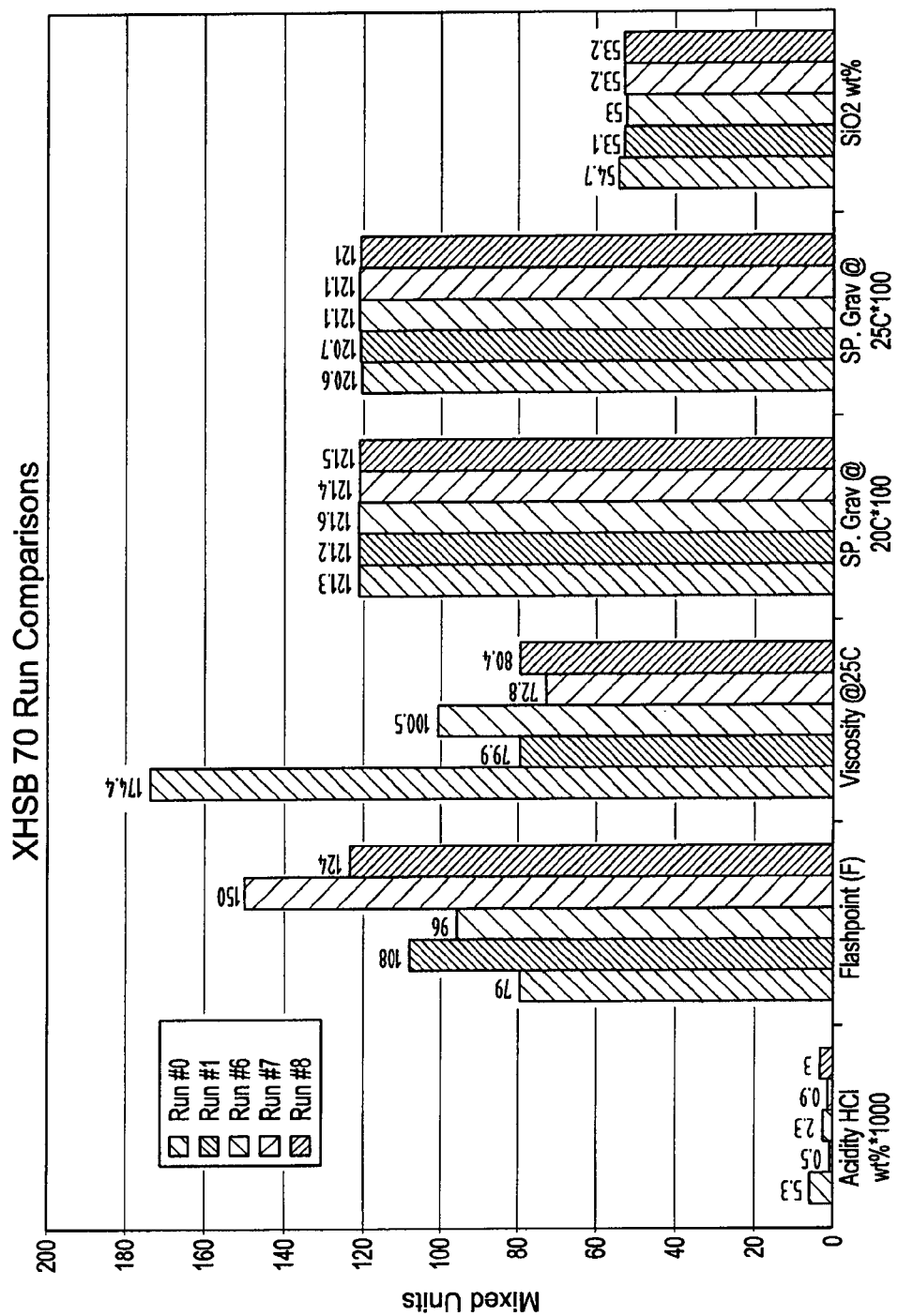
FIG. 2 is a graphical illustration showing the physical properties of several examples of ethylsilicate polymers of the present invention.

The graph shown in FIG. 2 shows results of multiple runs as set forth above.

COMPARATIVE EXAMPLE 1

Production of Ethylsilicate Polymer (No PNC Catalyst)

A 2 liter four necked round bottom flask, equipped with a central stirrer, thermometer, Claisen take off adaptor, and addition funnel, is charged with 780 grams of a condensed TEOS monomer including 28 wt % $SiO_2$, 0.1 grams of methansulfonic acid, 125 grams of 200 proof ethyl alcohol. The mixture is heated to 76° C. To this hot stirring mixture is added 94.5 grams of water over about 0.25 hours. The mixture is stirred at reflux for about 2 hours and then all ethanol was removed by heating. The temperature of the mixture increased from 80° C. to 140° C. over about 3 hours. 558 grams of volatile material was collected by distillation leaving 413 grams of a clear silicate ester mixture. This silicate ester mixture gelled on standing after 3 days.

Comparison of Molecular Distribution

Figure 3:
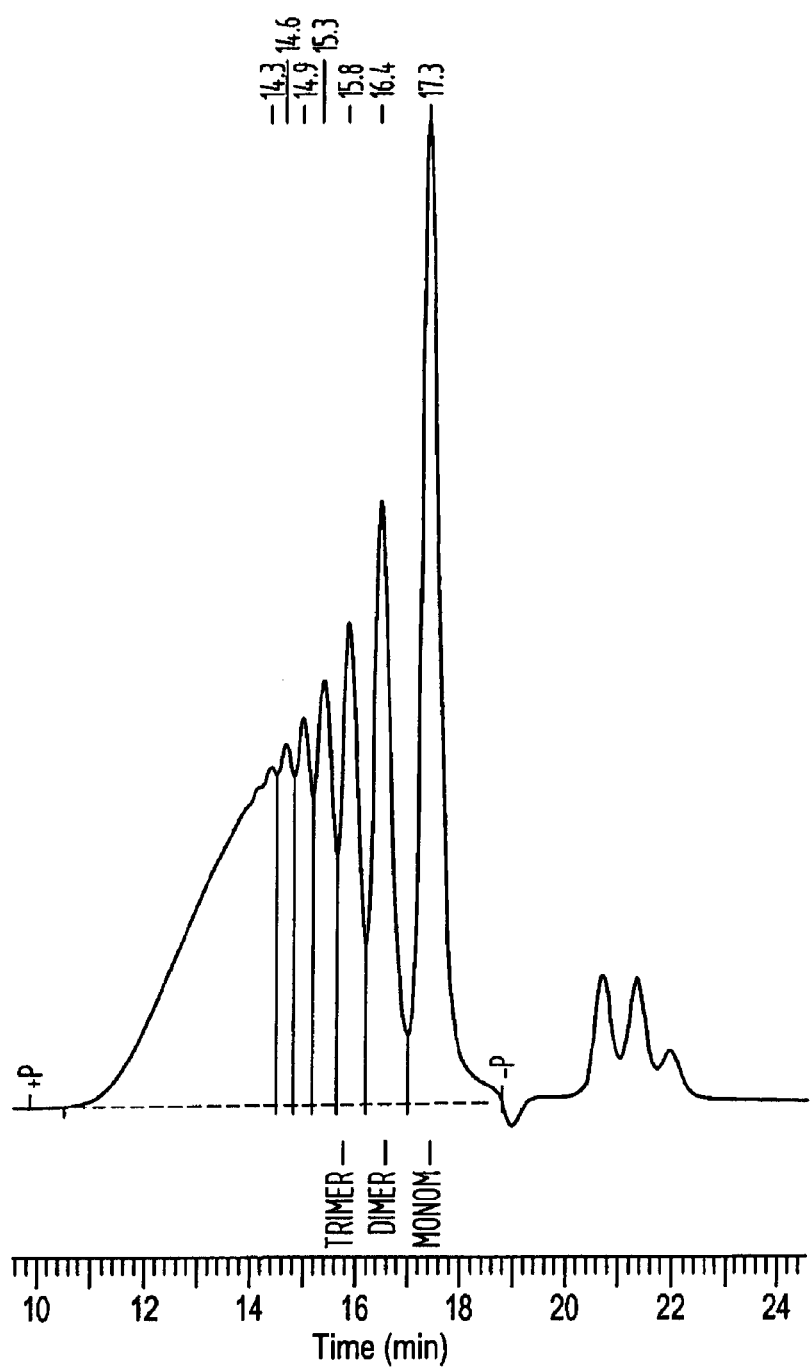
FIG. 3 is a gel permeation chromatograph of a Prior Art 40% hydrolyzed silicate polymer.

Gel permeation chromatography separates molecular components according to size. By selecting a chromatography support with proper hole size, silicate oligomers are conveniently separated. This technique is used for quality control purposes for the production of 40% hydrolyzed ethylsilicate polymer. The individual species are retained on the instrument for longer time periods, depending on the molecular size of each species. In the series of components: TEOS, dimer, trimer, tetramer and higher homologs have decreasing retention times as the size of the molecule increases. A typical diagram for 40% hydrolyzed ethylsilicate polymer is shown in FIG. 3. A progression of linear oligomers starting with TEOS monomer with each of the higher homologs clearly separated is shown in FIG. 3. The distribution continues with multiple components forming a continuum of components of increasing molecular size but not separated individually.

Figure 4:
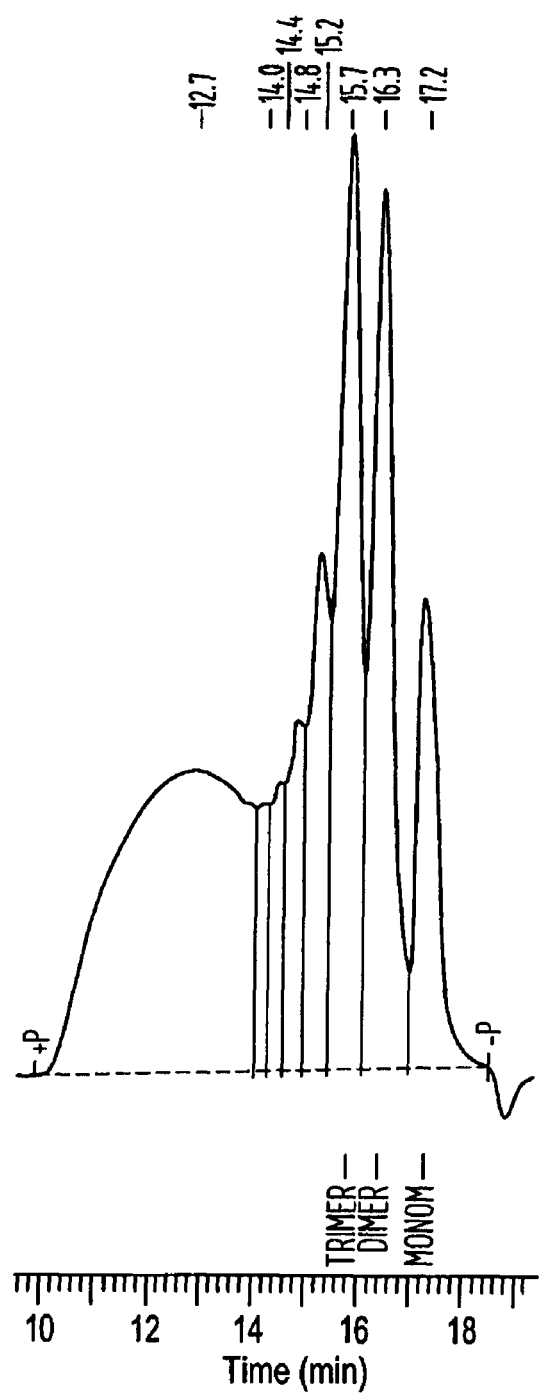
FIG. 4 is a gel permeation chromatograph of a 50% hydrolyzed silicate polymer.

The diagram of FIG. 4 shows the distribution of 50% hydrolyzed ethylsilicate polymer. In contrast to 40% hydrolyzed ethylsilicate polymer, the amount of linear oligomers is reduced however each is clearly still present. The high molecular size components are increase in amount compared to the 40% hydrolyzed ethylsilicate polymer distribution.

Figure 5:
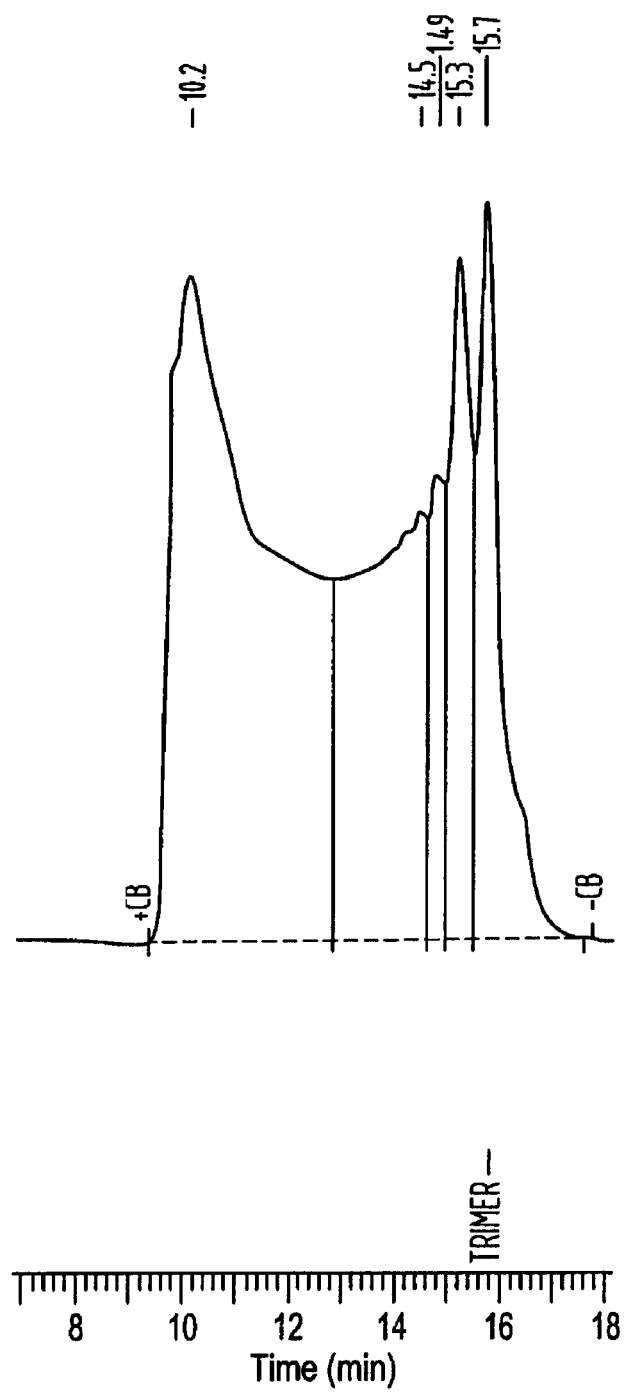
FIG. 5 is a gel permeation chromatograph of a 70% hydrolyzed polymer catalyzed with methansulfonic acid.

The distribution shown in FIG. 5 for 70% hydrolyzed polymer catalyzed with methansulfonic acid shows reduced amounts of the shorter linear components and a dramatically higher molecular weight distribution. Detectable levels of small linear components remain evident. This distribution was unstable gelling after 3 days.

Figure 6:
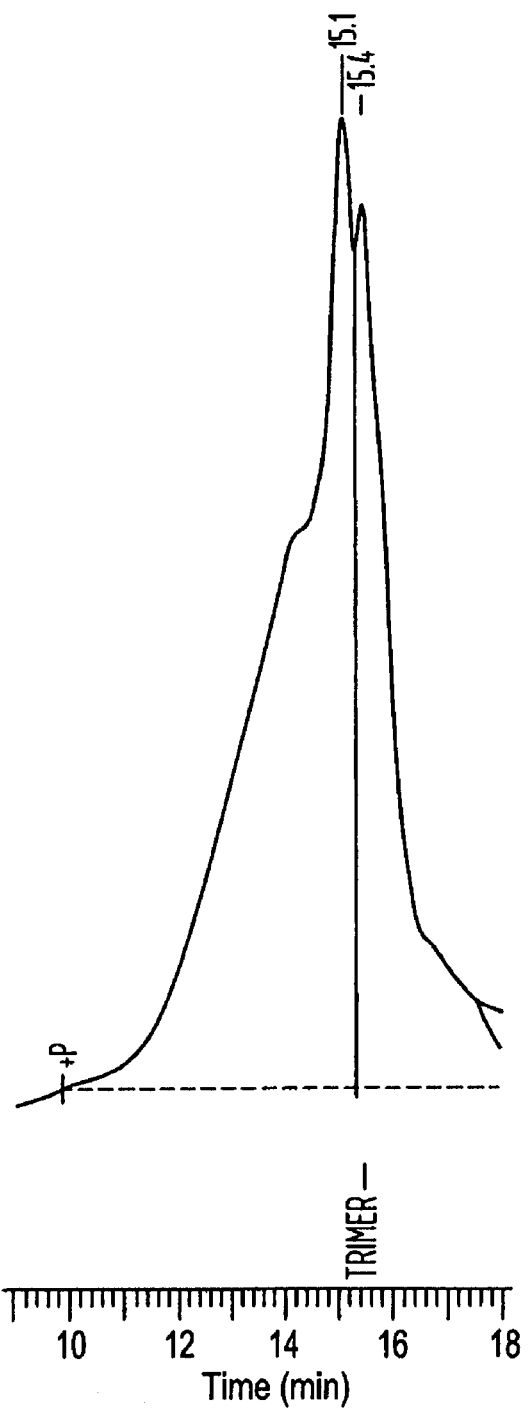
FIG. 6 is a gel permeation chromatograph of a 70% hydrolyzed polymer catalyzed with methansulfonic acid and a PNC catalyst.

The distribution shown in FIG. 6 shows the molecular distribution that arises from using a two step additional catalysts wherein one of the catalysts is a phosphonitrilic chloride catalyst. In this distribution, low molecular weight oligomers are eliminated. In addition, the amount of high molecular size material is also reduced even though the observed silica content was 54 wt % $SiO_2$. This material showed little change in distribution after 20 days stored at 55° C. This results in a molecular distribution that is better suited for many applications of ethylsilicate polymers.

INVENTIVE EXAMPLE 2

Production of Ethylsilicate Polymer Using PNC Catalyst

A four necked 5 liter round bottom flask, equipped with a central stirrer, thermometer, Claisen take off adaptor, and additional funnel, is charged with 3120 grams of a condensed TEOS monomer including 28 wt % $SiO_2$, 4 grams of $PNCl_2$, a PNC catalyst, prepared in Benzoyl Chloride Solution, and 500 grams of SDA 29 denatured ethyl alcohol. The mixture was heated to 80° C. To this hot stirring mixture was added 378 grams of water. HCl is introduced to the mixture via hydrolysis of the benzoyl chloride when the water is added. The mixture is stirred at reflux for 2 hours and then all ethanol was removed by heating. The temperature of the mixture increased from 80° C. to 140° C. over about 3 hours. Next, 2300 grams of volatile materials were collected by distillation leaving 1690 grams of a clear silicate ester mixture.

INVENTIVE EXAMPLE 3

Production of Ethylsilicate Polymer Using PNC Catalyst

Figure 7:
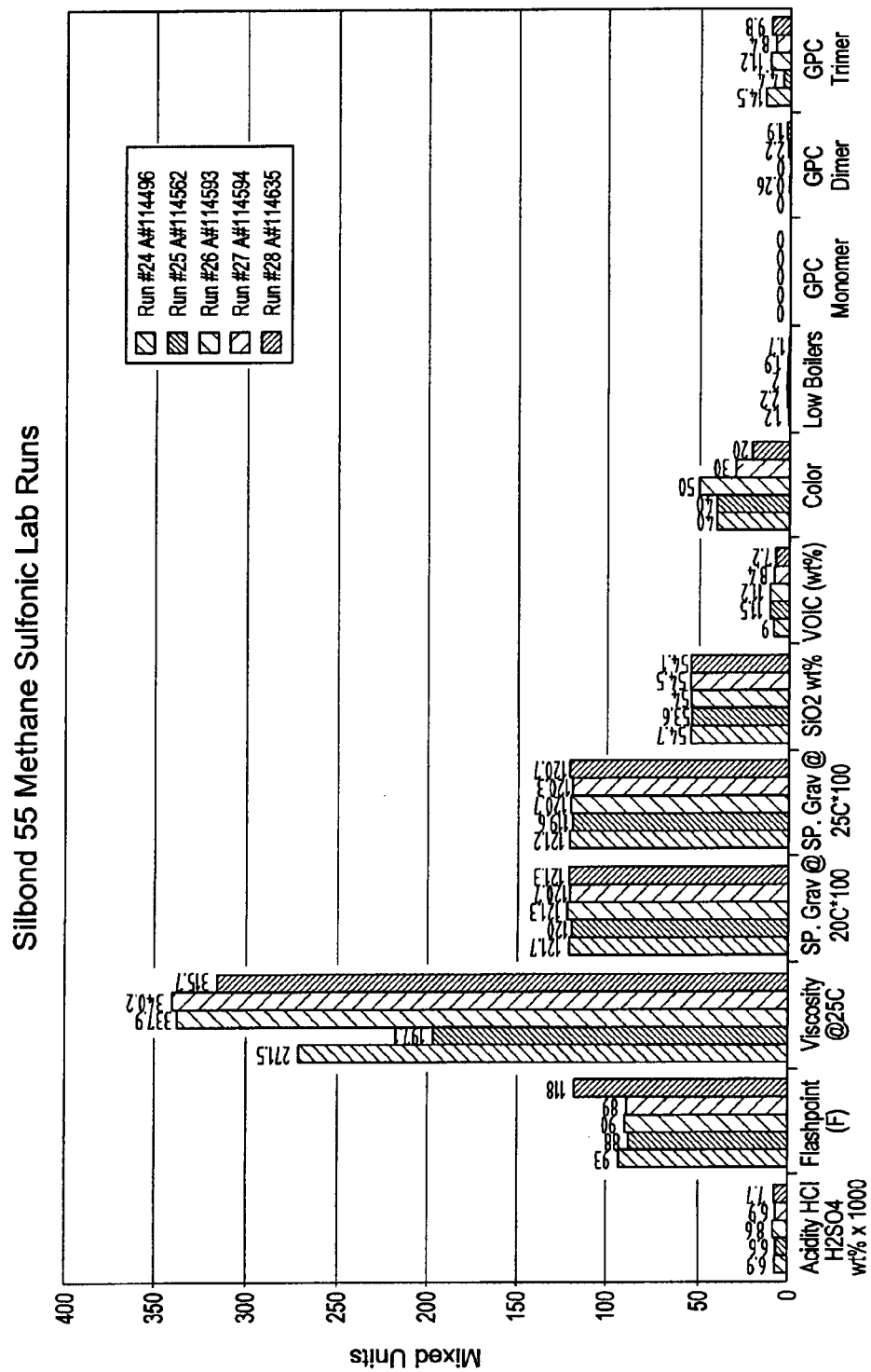
FIG. 7 is a graphical illustration showing the physical properties of five respective runs made in accordance with another example ethylsilicate polymer of the present invention.
Figure 8:
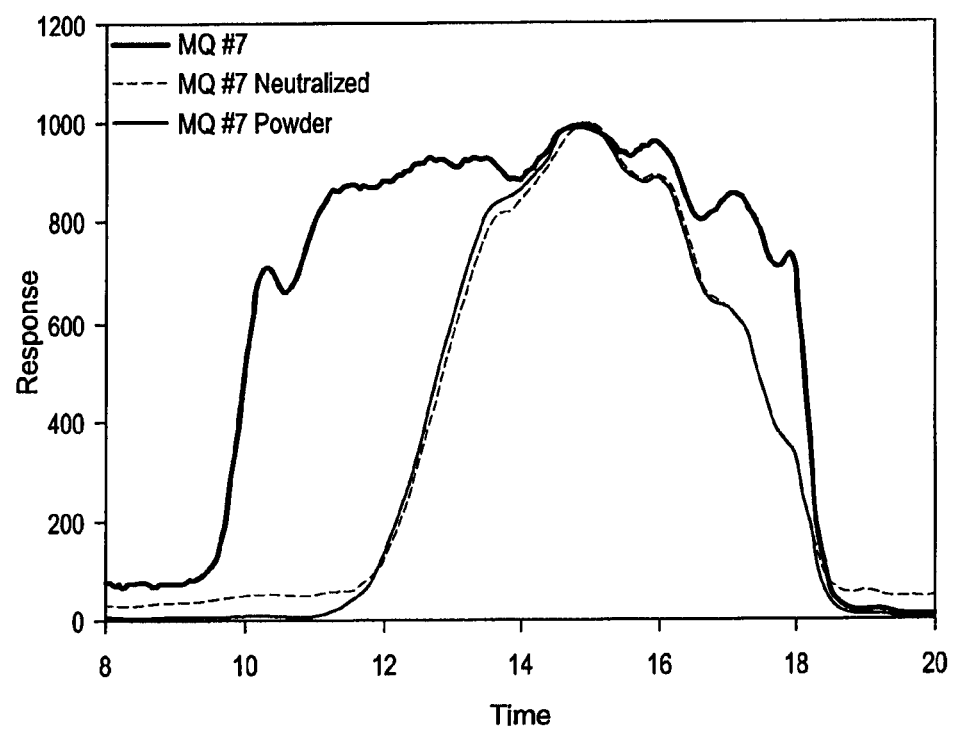
FIG. 8 is a graphical illustration showing a GPC of an MQ Resin.

A four necked 5 liter round bottom flask, equipped with a central stirrer, thermometer, Claisen take off adaptor, and addition funnel, is charged with 3120 grams of a condensed TEOS monomer including 28 wt % $SiO_2$, 0.4 grams of methansulfonic sulfonic acid (150 ppm), and 500 grams of SDA 29 denatured alcohol. The mixture is heated to 80° C. To this hot stirring mixture is added 378 grams of water. After completion of the addition of water, 0.4 grams of phosphonitrilic chloride trimer (PNC catalyst) was introduced. The mixture is stirred at reflux for 2 hours and then all ethanol was removed by heating. The temperature of the mixture increased from 80° C. to 140° C. over about 3 hours. Next, 2253 grams of volatile materials was collected by distillation leaving 1704 grams of a clear silicate ester mixture. Five repeated runs gave the data shown in FIG. 7.

COMPARATIVE EXAMPLE 3

Production of Ethylsilicate Polymer (No PNC2 Catalyst)

A four necked round bottom flask, equipped with a central stirrer, thermometer, Claisen take off adaptor, and addition funnel, is charged with 3120 grams of a condensed TEOS monomer including 28 wt % $SiO_2$, 0.5 grams of methansulfonic acid, and 500 grams of SDA 29 denatured alcohol. The mixture is heated to 80° C. To this hot stirring mixture is added 378 grams of water. The mixture is stirred at reflux for 2 hours and then all ethanol was removed by heating. The temperature of the mixture increased from 80° C. to 140° C. over about 3 hours. Next, 2178 grams of volatile materials was collected by distillation leaving 1722 grams of a clear silicate ester mixture. This silicate ester mixture had a dynamic viscosity of 1188 cps and the mixture gelled on standing.

Zinc Coatings Produced from the Ethylsilicate Polymer

One application where polymer distributions with reduced amounts of low molecular weight material is desired relates to zinc rich coatings. Ethylsilicate polymers are a preferred binder for zinc dust for corrosion resistant coatings. This is well documented in the prior art. The process of producing the ethylsilicate polymers used to form the zinc rich coatings includes replacing ethoxy groups bound to silicon with water. This is expressed as a percentage of the theoretical amount of water to replace all the ethoxy groups. The stoichiometric amount of water is 2 moles of water to 1 mole of TEOS. This is referred to as 100% hydrolysis. The zinc rich coating can be produced by a processes comprising up to 90% hydrolysis, such as 50% to 90% hydrolysis. Alternatively, the zinc rich coating is produced by a process comprising 75% to 85% hydrolysis.

The ethylsilicate polymer produced according to Inventive Example 3 can be used to produce the coatings. One of the developing limitations for this application is the amount of low boiling alcohol by-product that is liberated during hydrolysis of the ethylsilicate polymer. This raises the amount of volatile organic components present in the coating formulation. Using more highly hydrolyzed ethylsilicate polymers provides more environmentally friendly compositions that still meet the requirements of the marine coating industry. For a 40% hydrolyzed ethylsilicate polymer, 74% of the mass potentially liberates ethanol, where as a 70% hydrolyzed polymer is only 53% of the mass is ethanol. This represents a 28% reduction in by-product ethanol.

Silicone Resin Produced from the Ethylsilicate Polymer

TEOS or ethylsilicate polymer is frequently used as a component in silicone resin technology. One skilled in the art is familiar with the various classes of resins and combinations of them. Some examples are TQ resins, MQ resins, DQ resins, MQV resins, MQD resins, and DTQ resins A significant complication in resin production is the amount of ethanol liberated during hydrolysis and copolymerization when using TEOS as a source of tetrafunctional silicon (Q units). Furthermore achieving molecular distributions that minimize or eliminate low molecular weight by-products such as tetrakistrimethylsilicate(neopentamer) are especially desirable.

MQ resins are useful as additives for release coatings in pressure sensitive adhesive applications and liquid silicone rubber. The role of MQ resins in these formulations is modification of physical properties of a finally cured silicone rubber. The silicone rubber is hardened by this component to higher modulus. For pressure sensitive release application this increases the release force of the adhesive, therefore the MQ resins are known "as control of release additives" causing the release force to increase with increasing amounts of MQ resins. In liquid silicone rubber, the presence of the MQ resin increases the shore hardness of the rubber is increased, which decreases the deformability of the rubber. In both applications, presence of low molecular weight MQ resins is a detriment to the applications. In particular, tetrakistrimethylsiloxysilicate(neopentamer) causes significant issue with silicone rubber formulations by introducing extractable low molecular species into the cured silicone rubber.

Preferably, the MQ resin is formed using the stable ethylsilicate polymers of the invention, as described above. For example, the liquid MQ resin can be produced using the ethylsilicate polymer having a molecular weight distribution shown in FIG. 6, which is free of low molecular weight oligomers. Ethylsilicate polymers having less than 1 wt % low molecular weight oligomers, based on total weight of the ethylsilicate polymer and a silica content of 50 wt % to 60 wt % are preferred for the synthesis of the MQ resin. The MQ resin can be in a liquid form or a solid form. The compositions and characteristics of the MQ resins discussed in this application apply to both liquid MQ resins and solid MQ resins, unless stated otherwise.

The end product of MQ resin is a silicone material, specifically a trimethylsiloxypolysilicate, including functional groups $(CH_3)_3SiO$ (M group) and $SiO_4$ (Q group). The MQ resin has the following structure:

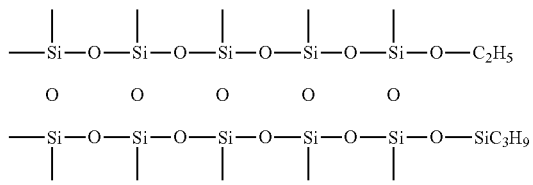

Preferably, the end product of MQ resin has an M group to Q group ratio of 0.1 to 0.6. Alternatively, the MQ resin has an M group to Q group ratio of 0.4 to 0.5.

For example, the MQ resin can have an M group to Q group ratio of 0.2; and include the M group in an amount of 16.67 wt % and the Q group in an amount of 83.33 wt %, based on total weight of the MQ resin.

Alternatively, the MQ resin can have an M group to Q group ratio of 0.4; and include the M group in an amount of 25.57 wt % and the Q group in an amount of 71.43 wt %, based on total weight of the MQ resin.

Alternatively, the MQ resin can have an M group to Q group ratio of 0.6; and include the M group in an amount of 62.55 wt % and the Q group in an amount of 37.45 wt %, based on total weight of the MQ resin.

Preferably, the end product of MQ resin comprises $SiO_2$ in an amount of 50 wt % to 60 wt %. Alternatively, the MQ resin comprises $SiO_2$ in an amount of 53 wt % to 55 wt %. The amount of $SiO_2$ in the liquid MQ resin is determined by hydrolyzing and dehydrating the MQ resin to a gelled state with concentrated sulfuric acid. The gelled sample is treated with 70% nitric acid to oxidize the remaining organic components. The crucible contents are slowly burned off and the silica gel is fired to $SiO_2$ in a muffle furnace. The fired $SiO_2$ is then weighted to provide the wt % of $SiO_2$ in the liquid MQ resin.

Preferably, the end product of MQ resin comprises the following components: ethylsilicate polymer comprising 50 wt % to 60 wt % $SiO_2$; ethyl alcohol (ETOH); water; methanesulfonic acid ($CH_3SO_3H$); toluene ($C_7H_8$ or $C_6H_5CH_3$); and hexamethyldisiloxane (HMDSO)($C_6H_{18}OSi_2$). The wt % of each component of the MQ resin can be determined by nuclear magnetic resonance (NMR). Further, gel permeation chromatography (GPC) can be used to separate components of the liquid MQ resin according to their molecular size, based on the flow of the liquid MQ resin through a porous packing.

Preferably, the end product of MQ resin includes the ethylsilicate polymer comprising 50 wt % to 60 wt % $SiO_2$ content, or 55 wt % $SiO_2$, as described above. Preferably, the MQ resin includes ethylsilicate polymer in an amount of at least 30 wt %, based on the total weight of the MQ resin. Alternatively, the MQ resin includes ethylsilicate polymer in an amount of 30 wt % to 50 wt %, or 36 wt % to 44 wt %.

The end product of MQ resin typically includes an alcohol, such as ETOH, in an amount of 8 wt % to 15 wt %, or 10 wt % to 14 wt %.

The end product of MQ resin typically includes water in an amount of 5 wt % to 10 wt %, or 6 wt % to 9 wt %.

The end product of MQ resin typically includes the methanesulfonic acid ($CH_3SO_3H$) in an amount of 0.001 wt % to 0.1 wt %, or 0.01 wt % to 0.07 wt %.

The end product MQ resin typically includes the toluene in an amount of 18 wt % to 35 wt %, or 22 wt % to 26 wt %.

The end product of MQ resin typically includes the HMDSO in an amount of 18 wt % to 35 wt %, or 22 wt % to 26 wt %.

The end product of MQ resin typically includes tetrakist-rimethylsiloxysilicate (neopentamer) in an amount not greater than 5 wt %, or not greater than 1 wt %. or 0.01 wt % to 5 wt %.

The molecular weight at peak (Mp), average molar mass (Mz), and polysipersity of both the liquid and solid MQ resins can be determined by conventional GPC with refractive index detection.

As stated above, the MQ resin for use in silicone rubber applications preferably has a high molecular weight. The end product of MQ resin can be in liquid form and have a molecular weight at peak (Mp) of at least 33,000 g/mol, or 33,000 g/mol to 36,000 g/mol, or 34,000 g/mol to 35,000 g/mol. For example, the liquid MQ resin can have an average molecular weight at peak (Mp) of 35,000. The molecular weight at peak (Mp) can be referred to as the average molecular weight.

The liquid MQ resin typically has an average molar mass (Mz) of at least 400,000 g/mol, or 400,000 g/mol to 600,000 g/mol, or 500,000 g/mol to 600,000 g/mol. For example, the liquid MQ resin can have an average molar mass (Mz) of 535,000 g/mol.

The liquid MQ resin typically has a polydisparity of 6 to 10, or 7.2 to 9.4. For example, the liquid MQ resin can have a polydisparity of 8.3.

The MQ resin can also be in solid form and have a molecular weight at peak (Mp) of at least 34,000 g/mol, or of 34,000 g/mol to 36,000 g/mol. For example, the liquid MQ resin can have an average molecular weight at peak (Mp) of 34,600.

The solid MQ resin typically has an average molar mass (Mz) of at least 90,000 g/mol, or 90,000 g/mol to 110,000 g/mol. For example, the solid MQ resin can have an average molar mass (Mz) of 107,000 g/mol. The average molar mass (Mz) is determined dividing the weight average molecular weight of the MQ resin by the number average molecular weight of the MQ resin.

The solid MQ resin typically has a polydisparity of 2 to 4, or 2.3 to 3.2. For example, the solid MQ resin can have a polydisparity of 2.8.

As alluded to above, the ethylsilicate polymer used to produce the MQ resin is free, essentially free, or substantially free of monomer, such as TEOS monomer. Thus, the end product of MQ resin is free, essentially free, or substantially free of monomer. Preferably, the MQ resin includes monomer in an amount not greater than 1 wt %, more preferably not greater than 0.5 wt %, even more preferably not greater than 0.1 wt %, and most preferably 0 wt %.

As alluded to above, the end product of MQ resin preferably includes no low boilers, such as low boiling alcohol by-product, liberated during hydrolysis of the ethylsilicate polymer. The low boiling alcohol by-product (low boilers) content raises the amount of volatile material, such as volatile organic components (VOC) present in the MQ resin. Preferably, the MQ resin includes low boilers in an amount less than 2.5 wt %, based on the total weight of the MQ resin and the low boilers. The MQ resin could include low boilers in an amount of 0.1 wt % to 2.5 wt %. The amount of low boilers is measured using Gas Liquid Chromatography.

During the process of producing the ethylsilicate polymer used to produce the MQ resin, it is desirable to limit the amount of volatile material (VOC) produced, which can be collected by distillation. The process of producing the MQ resin preferably includes generating not greater than 15 wt % volatile material, based on the total weight of the MQ resin and the volatile material, preferably not greater than 12 wt %. For example, the process could include generating 1 wt % to 12 wt % volatile material, based on the total weight of the MQ resin and the volatile material. The amount of volatile material of the MQ resin is measured according to the ASTM D 2369-07 standard.

The end product of MQ resin preferably includes no HCl acid. The MQ resin could include HCl acid in an amount not greater than 0.1 wt %, based on the total weight of the MQ resin, and preferably not greater than 0.006 wt %, based on the total weight of the MQ resin. The amount of HCl can be measured by titrating a sample of the MQ resin to the neutral red-methylene blue end point and then calculating the weight percent of acidity or alkalinity.

The liquid MQ resin typically has a dynamic viscosity of 50 cps to 750 cps at 25° C., or 50 cps to 55 cps at 25° C. The dynamic viscosity is determined by measuring the time (in seconds) required for a standard volume of the liquid MQ resin to flow through a calibrated capillary. The time is multiplied by the viscometer constant and the specific gravity of the liquid MQ resin to provide the dynamic viscosity of the liquid MQ resin in cps.

As alluded above, the liquid MQ resin provides improved viscosity stability. Preferably, the liquid MQ resin maintains a dynamic viscosity of from 50 cps to 750 cps at 25° C. for at least 2 months, more preferably at least 3 months.

Preferably, the liquid MQ resin has a flash point of at least 100° F., more preferably at least 110° F. The flash point of the liquid MQ resin is measured according to the ASTM D 56-05 standard.

The MQ resin typically has a specific gravity of from 1.14 g/cm$^3$ to 1.25 g/cm$^3$. Alternatively, the MQ resin has a specific gravity of from 1.16 g/cm$^3$ to 1.24 g/cm$^3$, or 1.19 g/cm3 to 1.22 g/cm$^3$. The specific gravity is measured according to ASTM D 891-09.

As alluded to above, in the process of producing the MQ resin, it is desirable to limit the amount of ethanol liberated during hydrolysis and thus the amount of low boilers. The amount of ethanol generated during the process is determined by the following formula:

wt % ethanol generated=2×molar mass of ethanol×
H$_2$O Added (wt %)/molar mass of H$_2$O As stated above, the process includes liberating the ethanol generated during hydrolysis. Preferably, the process of producing the MQ resin comprises liberating ethanol in an amount not greater than 70 wt %, more preferably not greater than 60 wt %, and most preferably not greater than 35 wt %.

As stated above, the process of producing the ethylsilicate polymers used to form the MQ resin includes replacing ethoxy groups bound to silicon of the TEOS monomer with water. This is expressed as a percentage of the theoretical amount of water to replace all the ethoxy groups. The stoichiometric amount of water is 2 moles of water to 1 mole of TEOS. This is referred to as 100% hydrolysis. The MQ resin is typically produced by a processes comprising 50% to 90% hydrolysis of the TEOS monomer, or 75% to 85% hydrolysis of the TEOS monomer.

The GPC traces shown in FIGS. 5 and 6 compare MQ Resins from 40% hydrolyzed ethylsilicate polymer and from MQ Resins prepared from an example stable ethylsilicate polymer of the present invention, PNC catalyzed ethylsilicate polymer including 55 wt % SiO$_2$. As is seen in the diagrams, the amount of low size material below 16 minute retention time for the is negligible, where the amount of low size material in the 40% hydrolyzed polymer is substantially more. This is an indication that migratory material present in the polymer distribution will be favorably reduced, by using the product of the present invention as a starting material.

The MQ resin is produced by a process comprising mixing the stable ethylsilicate polymer, as described above, with alcohol and a hydrolysis catalyst, such as methansulfonic acid. The process next includes heating the mixture to a temperature of 80° C. and adding water to the mixture. The mixture is stirred at reflux and then toluene and hexamethyldisiloxane are added. The volatile material is removed to provide the MQ resin.

Preparation of Resins that Include Q Units

The example below illustrates the utility of these new molecular distributions. As discussed above, MQ resins are silicate resins that have utility in silicone elastomers and pressure sensitive adhesives. A key measurement of the quality of these resins is the average molecular weight and content of tetrakistrimethylsilylsilicate. The following represents an example of the advantages of producing these resins with the ethylsilicate polymers described in this invention.

INVENTIVE EXAMPLE 4

Production of MQ Resin from Ethylsilicate Polymer

A four necked round bottom flask, equipped with a central stirrer, thermometer, Claisen take off adaptor, and addition funnel, is charged with 835 grams of ethylsilicate polymer including 55 wt % $SiO_2$, 0.5 grams of methansulfonic acid, and 250 grams of SDA 29 denatured alcohol. The ethylsilicate polymer has the properties described above and is made according to the process shown in FIG. 1. The mixture is heated to 80° C. To this hot stirring mixture is added 155 grams of water. The mixture is stirred at reflux for 2 hours and then 500 grams of toluene, 324 grams of hexamethyldisiloxane are added. 800 grams of volatile material was removed to produce a 50% solids solution of MQ resin in solution. A sample of the MQ resin is provided in powder form and analyzed by gel permeation chromatography. Analysis of the MQ resin by gel permeation chromatography produced the following molecular distributions:

| Sample | Mp | Mn | Mw | Mz | PD |
|---|---|---|---|---|---|
| MQ resin | 34600 | 18000 | 51100 | 107000 | 2.8 |

The molecular distributions of the MQ resin produced showed no trimethylsilylated species and substantially higher molecular weight than the MQ resins reported in literature. An article in the J. Appl Polym Sci 70: 1753-1757, 1998 reported molecular weights of 4200 to 4956 and molecular distributions that indicated a large peak at long retention time, indicating the presence of low molecular weight trimethylsilylated species such as tetrakistrimethylsilylsilicate.

INVENTIVE EXAMPLE 5

Composition of MQ Resin from Ethylsilicate Polymer

A liquid MQ resin is formed from hydrolyzed ethylsilicate polymer including 50 wt % $SiO_2$. The liquid MQ resin has an M group to Q group mole ratio of 0.4. The MQ resin comprises 40.45 wt % ethylsilicate polymer; 12.1 wt % ETOH; 7.5 wt % water; 0.04 wt % methane sulfonic acid; 24.22 wt % toluene; and 15.69 wt % HMDSO.

While the invention has been described in connection with its preferred embodiments it should be recognized that changes and modifications may be made therein without departing from the scope of appended claims.

The invention claimed is:

1. An MQ resin, in solid or liquid form, comprising hexamethyldisiloxane ($C_6H_{18}OSi_2$) in an amount of 18-35 wt % of the MQ resin and an ethylsilicate polymer, wherein said ethylsilicate polymer has a dynamic viscosity of 10 csp to 1000 cps at 25° C. and includes from 50 wt % to 60 wt % silica ($SiO_2$), and wherein said ethylsilicate polymer has less than 1 wt % monomers, based on the total weight of said ethylsilicate polymer, and said MQ resin further comprising alcohol in an amount of 8 wt% to 15 wt % based on the total weight of said MQ resin.

2. An MQ resin, in solid or liquid form, comprising hexamethyldisiloxane ($C_6H_{18}OSi_2$) in an amount of 18-35 wt % of the MQ resin and an ethylsilicate polymer, wherein said ethylsilicate polymer has a dynamic viscosity of 10 cps at 25° C. and includes from 50 wt % to 60 wt % silica ($SiO_2$), and wherein said ethylsilicate polymer has less than 1 wt % monomers, based on the total weight of said ethylsilicate polymer, and said MQ resin further comprising water in an amount of 5 wt % to 10 wt % based on the total weight of said MQ resin.

3. An MQ resin in solid or liquid form, comprising hexamethyldisiloxane ($C_6H_{18}OSi_2$) and an ethylsilicate polymer, wherein said ethylsilicate polymer has a dynamic viscosity of 10 csp to 1000 cps at 25° C. and includes from 50 wt % to 60 wt % silica ($SiO_2$), and wherein said ethylsilicate polymer has less than 1 wt % monomers, based on the total weight of said ethylsilicate polymer and wherein the MQ resin has a M group to Q group ratio of 0.1 to 0.6, wherein said M group is $(CH_3)_3SiO$ and said Q group is $SiO_4$.

4. The MQ resin of claim 3 including $SiO_2$ in an amount of 53 wt % to 55 wt % of the ethylsilicate polymer.

5. The MQ resin of claim 3 having less than 1 wt % tetrakistrimethylsiloxysilicate (neopentamer) of the MQ resin.

6. The MQ resin of claim 3 having less than 1 wt % of the MQ resin of at least one linear oligomer.

7. The MQ resin of claim 3 including at least 30 wt % of the MQ resin of said ethylsilicate polymer.

8. The MQ resin of claim 3 including at least 40 wt % of the M Q resin of said ethylsilicate polymer.

9. The MQ resin of claim 3 including ethyl alcohol, water, methanesulfonic acid, and toluene.

10. The MQ resin of claim 3 in liquid form and having a dynamic viscosity of 50 cps to 750 cps at 25° C.

11. The MQ resin of claim 10 maintaining a dynamic viscosity of 50 cps to 750 cps at 25° C. for at least 2 months.

12. The MQ resin of claim 3 in liquid form and having a molecular weight at peak (Mp) of 33,000 g/mol to 35,000 g/mol.

13. An MQ resin in solid or liquid form, comprising hexamethyldisiloxane ($C_6H_{18}OSi_2$) and an ethylsilicate polymer, wherein said ethylsilicate polymer has a dynamic viscosity of 10 csp to 1000 cps at 25° C. and includes from 50 wt % to 60 wt % silica ($SiO_2$), and wherein said ethylsilicate polymer has less than 1 wt % monomers, based on the total weight of said ethylsilicate polymer and wherein the MQ resin is in liquid form and having an average molar mass (Mz) of 400,000 g/mol to 600,000 g/mol.

14. The MQ resin of claim 13 in solid form and having a molecular weight at peak (Mp) of 34,000 g/mol to 36,000 g/mol.

15. The MQ resin of claim 3 in liquid form and having a specific gravity of 1.14 g/cm$^3$ to 1.25 g/cm$^3$.

16. An MQ resin in solid or liquid form, comprising hexamethyldisiloxane ($C_6H_{18}OSi_2$) and an ethylsilicate polymer, wherein said ethylsilicate polymer has a dynamic viscosity of 10 csp to 1000 cps at 25° C. and includes from 50 wt % to 60 wt % silica (SiO$_2$), and wherein said ethylsilicate polymer has less than 1 wt % monomers, based on the total weight of said ethylsilicate polymer and wherein the MQ resin is in liquid form and having a polydispersity of 6 to 10.

17. The MQ resin of claim 3 including HCl acid in an amount less than 0.1 wt % of the MQ resin.

18. The MQ resin of claim 3, wherein said ethylsilicate polymer is produced by a process comprising adding a PNC catalyst to a mixture including a TEOS monomer and ethanol.

19. The MQ resin of claim 18 wherein said process includes adding a hydrolysis catalyst to said mixture before adding said PNC catalyst.

20. The MQ resin of claim 3 produced by a process comprising 50% to 90% hydrolysis of a TEOS monomer.

21. An MQ resin of claim 3 produced by a process comprising generating not greater than 2.5 wt % low boiling alcohol by-product having a boiling point of 70° C. to 100° C., based on the total weight of said MQ resin and said low boiling alcohol by-product.

22. The MQ resin of claim 3 produced by a process comprising generating not greater than 15 wt % volatile material, based on the total weight of said MQ resin and said volatile material.

23. The MQ resin of claim 3 produced by a process comprising generating not greater than 70 wt % ethanol of the MQ resin.

24. The MQ resin of claim 13, wherein said ethylsilicate polymer is produced by a process comprising adding a PNC catalyst to a mixture including a TEOS monomer and ethanol.

25. The MQ resin of claim 24 wherein said process includes adding a hydrolysis catalyst to said mixture before adding said PNC catalyst.

26. An MQ resin of claim 3 produced by a process comprising generating not greater than 2.5 wt % low boiling alcohol by-product having a boiling point of 70° C. to 100° C., based on the total weight of said MQ resin and said low boiling alcohol by-product.

27. The MQ resin of claim 3 produced by a process comprising generating not greater than 15 wt % volatile material, based on the total weight of said MQ resin and said volatile material.

28. The MQ resin of claim 3 produced by a process comprising generating less than 70 wt % ethanol of the MQ resin.

29. An MQ resin in solid or liquid form comprising a stable ethylsilicate polymer in an amount of at least 30 wt % of the MQ resin, wherein said stable ethylsilicate polymer includes from 50 wt % to 60 wt % silica (SiO$_2$), less than 1 wt % of at least one monomer of said stable ethylsilicate polymer, and has a dynamic viscosity of 10 csp to 1000 cps at 25° C.; and wherein said MQ resin includes alcohol in an amount of 8 wt % to 15 wt % of the MQ resin, water in an amount of 5 wt % to 10 wt % of the MQ resin, methanesulfonic acid (CH$_3$SO$_3$H) in an amount not greater than 0.1 wt % of the MQ resin, toluene in an amount of 18 wt % to 35 wt % of the MQ resin, and hexamethyldisiloxane in an amount of 18 wt % to 35 wt % of the MQ resin.

30. An MQ resin in liquid form comprising:
a stable ethylsilicate polymer in an amount of at least 30 wt % of the MQ resin, wherein said stable ethylsilicate polymer includes from 50 wt % to 60 wt % silica (SiO$_2$), not greater than 1 wt % of at least one monomer, and has a dynamic viscosity of from 10 csp to 1000 cps at 25° C.;
alcohol in an amount of 8 wt % to 15 wt % of the MQ resin;
water in an amount of 5 wt % to 10 wt % of the MQ resin;
methanesulfonic acid (CH$_3$SO$_3$H) in an amount not greater than 0.1 wt % of the MQ resin;
toluene in an amount of 18 wt % to 35 wt % of the MQ resin;
hexamethyldisiloxane in an amount of 18 wt % to 35 wt % of the MQ resin;
an M group to Q group ratio of 0.1 to 0.6;
not greater than 1 wt % of at least one monomer of the MQ resin;
not greater than 1 wt % tetrakistrimethylsiloxysilicate (neopentamer) of the MQ resin;
not greater than 1 wt % of the MQ resin of at least one linear oligomer;
HCl acid in an amount not greater than 0.1 w t% of the MQ resin;
a dynamic viscosity of 50 cps to 750 cps at 25° C.;
a molecular weight at peak (Mp) of 33,000 g/mol to 35,000 g/mol;
an average molar mass (Mz) of 400,000 g/mol to 600,000 g/mol;
a specific gravity of 1.14 g/cm$^3$ to 1.25 g/cm$^3$; and
a polydiperity of 6 to 10.

31. An MQ resin in solid form comprising:
a stable ethylsilicate polymer in an amount of at least 30 wt % of the MQ resin, wherein said stable ethylsilicate polymer includes from 50 wt % to 60 wt % silica (SiO$_2$), not greater than 1 wt % of at least one monomer, and has a dynamic viscosity of from 10 csp to 1000 cps at 25° C.;
alcohol in an amount of 8 wt % to 15 wt % of the MQ resin;
water in an amount of 5 wt % to 10 wt % of the MQ resin;
methanesulfonic acid (CH$_3$SO$_3$H) in an amount not greater than 0.1 wt % of the MQ resin;
toluene in an amount of 18 wt % to 35 wt % of the MQ resin;
hexamethyldisiloxane in an amount of 18 wt % to 35 wt % of the MQ resin;
an M group to Q group ratio of 0.1 to 0.6;
not greater than 1 wt % tetrakistrimethylsiloxysilicate (neopentamer) of the MQ resin;
not greater than 1 wt % of the MQ resin of at least one linear oligomer;
HCl acid in an amount not greater than 0.1 wt % of the MQ resin;
a dynamic viscosity of 50 cps to 750 cps at 25°0 C.;
a molecular weight at peak (Mp) of 33,000 g/mol to 35,000 g/mol;
an average molar mass (Mz) of 90,000 g/mol to 111,000 g/mol;
a specific gravity of 1.14 g/cm$^3$ to 1.25 g/cm$^3$; and
a polydiperity of 2 to 4.

32. The MQ resin of claim 13, wherein said ethylsilicate polymer is produced by a process comprising adding a PNC catalyst to a mixture including a TEOS monomer and ethanol.

33. The MQ resin of claim 32 wherein said process includes adding a hydrolysis catalyst to said mixture before adding said PNC catalyst.

* * * * *